US010171485B2

(12) United States Patent
Boss et al.

(10) Patent No.: US 10,171,485 B2
(45) Date of Patent: *Jan. 1, 2019

(54) SYSTEM CONVERSION IN A NETWORKED COMPUTING ENVIRONMENT

(71) Applicant: INTERNATIONAL BUSINESS MACHINES CORPORATION, Armonk, NY (US)

(72) Inventors: Gregory J. Boss, Saginaw, MI (US); Rick A. Hamilton, II, Charlottesville, VA (US); Jeffrey R. Hoy, Gibsonia, PA (US); Agueda M. H. Magro, Zapopan (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,460

(22) Filed: Dec. 13, 2017

(65) Prior Publication Data

US 2018/0103048 A1 Apr. 12, 2018

Related U.S. Application Data (63) Continuation of application No. 14/699,206, filed on Apr. 29, 2015, now Pat. No. 9,954,870.

(51) Int. Cl.
*G06F 12/14* (2006.01)
*H04L 29/06* (2006.01)
*G06F 9/455* (2018.01)

(52) U.S. Cl.
CPC ...... *H04L 63/1416* (2013.01); *G06F 9/45558* (2013.01); *H04L 63/1491* (2013.01);
(Continued)

(58) Field of Classification Search
USPC ............................. 726/22–25; 713/187–189
See application file for complete search history.

(56) References Cited

U.S. PATENT DOCUMENTS 6,742,124 B1 * 5/2004 Kilpatrick ............. G06F 21/316
713/194
7,042,852 B2 5/2006 Hrastar
(Continued)

FOREIGN PATENT DOCUMENTS

CN 101567887 5/2012

OTHER PUBLICATIONS

Locasto et al., "FLIPS: Hybrid Adaptive Intrusion Prevention", Recent Advances in Intrusion Detection, 2005, abstract only, 3 pages.
(Continued)

*Primary Examiner* — Amare F Tabor
(74) *Attorney, Agent, or Firm* — William H. Hartwell; Andrew M. Calderon; Roberts Mlotkowski Safran Cole & Calderon, P.C.

(57) ABSTRACT

Approaches for providing security in a networked computing environment are provided. The method includes detecting, by at least one computer device, a breach of a first system in the networked computing environment. The method also includes identifying a second system in the in the networked computing environment as an at-risk system based on a proximity of the second system to the first system. The method additionally includes re-generating, by the at least one computer device, the second system as a new system at a new location in the networked computing environment. The method further includes converting, by the at least one computer device, the second system to a decoy system.

14 Claims, 8 Drawing Sheets

(52) U.S. Cl.
CPC .............. *G06F 2009/45562* (2013.01); *G06F 2009/45587* (2013.01); *G06F 2009/45591* (2013.01); *G06F 2009/45595* (2013.01)

(56) References Cited

U.S. PATENT DOCUMENTS

| | | | |
|---|---|---|---|
| 7,383,578 B2 | 6/2008 | Blake et al. | |
| 7,437,766 B2 | 10/2008 | Cohen et al. | |
| 7,475,427 B2 | 1/2009 | Palliyil et al. | |
| 7,634,812 B2 | 12/2009 | Costa et al. | |
| 7,636,944 B2 | 12/2009 | Raikar | |
| 7,647,637 B2 | 1/2010 | Schuba et al. | |
| 7,668,843 B2 * | 2/2010 | Ertoz | G06F 21/552 706/20 |
| 7,694,339 B2 | 4/2010 | Blake et al. | |
| 7,752,432 B2 | 7/2010 | Sheymov | |
| 7,752,669 B2 | 7/2010 | Palliyil et al. | |
| 7,904,959 B2 | 3/2011 | Sidiroglou et al. | |
| 7,934,258 B2 | 4/2011 | Wahl | |
| 8,001,583 B2 * | 8/2011 | Waizumi | H04L 63/1458 726/3 |
| 8,060,939 B2 | 11/2011 | Lynn et al. | |
| 8,065,722 B2 | 11/2011 | Barford et al. | |
| 8,122,505 B2 | 2/2012 | Verma et al. | |
| 8,141,152 B1 | 3/2012 | Hwang et al. | |
| 8,156,556 B2 | 4/2012 | Krishnamurthy | |
| 8,161,540 B2 | 4/2012 | Mantripragada et al. | |
| 8,181,250 B2 | 5/2012 | Rafalovich et al. | |
| 8,209,760 B1 | 6/2012 | Hardman | |
| 8,286,237 B2 * | 10/2012 | Moghe | H04L 63/1408 726/22 |
| 8,413,241 B2 | 4/2013 | Weeks et al. | |
| 8,443,446 B2 | 5/2013 | Lamastra et al. | |
| 8,464,341 B2 | 6/2013 | Cohen | |
| 8,479,288 B2 | 7/2013 | Martin et al. | |
| 8,528,091 B2 | 9/2013 | Bowen et al. | |
| 8,544,087 B1 * | 9/2013 | Eskin | G06F 21/552 726/22 |
| 8,549,642 B2 | 10/2013 | Lee | |
| 8,572,244 B2 | 10/2013 | Campagnoni | |
| 8,578,497 B2 | 11/2013 | Antonakakis et al. | |
| 8,584,219 B1 | 11/2013 | Toole et al. | |
| 8,769,687 B2 | 7/2014 | Hoefelmeyer et al. | |
| 8,819,825 B2 | 8/2014 | Keromytis et al. | |
| 8,902,066 B2 | 12/2014 | Parker et al. | |
| 8,943,594 B1 | 1/2015 | Arrowood | |
| 8,955,143 B1 | 2/2015 | Ramalingam et al. | |
| 8,973,142 B2 | 3/2015 | Shulman et al. | |
| 9,094,444 B2 * | 7/2015 | Baltatu | H04L 63/1425 |
| 9,106,687 B1 * | 8/2015 | Sawhney | H04L 63/1416 |
| 9,118,709 B2 | 8/2015 | Oliphant et al. | |
| 9,356,942 B1 | 5/2016 | Joffe | |
| 9,356,950 B2 | 5/2016 | Vissamsetty et al. | |
| 9,367,809 B2 * | 6/2016 | Puri | G06N 5/04 |
| 9,401,927 B2 | 7/2016 | Shulman et al. | |
| 9,462,013 B1 | 10/2016 | Boss et al. | |
| 9,503,463 B2 | 11/2016 | Karta et al. | |
| 9,609,019 B2 | 3/2017 | Vissamsetty et al. | |
| 9,875,347 B2 * | 1/2018 | Baghdasaryan | G06Q 20/40 |
| 2004/0111636 A1 | 6/2004 | Baffes et al. | |
| 2005/0166072 A1 | 7/2005 | Converse et al. | |
| 2006/0101516 A1 | 5/2006 | Sudaharan et al. | |
| 2006/0161786 A1 | 7/2006 | Rao | |
| 2010/0024017 A1 | 1/2010 | Ashfield et al. | |
| 2010/0122078 A1 | 5/2010 | Sheymov | |
| 2010/0146615 A1 | 6/2010 | Locasto et al. | |
| 2010/0269175 A1 | 10/2010 | Stolfo et al. | |
| 2011/0167494 A1 | 7/2011 | Bowen et al. | |
| 2011/0179487 A1 | 7/2011 | Lee | |
| 2011/0276597 A1 | 11/2011 | Little | |
| 2012/0072990 A1 | 3/2012 | Gutt et al. | |
| 2012/0151585 A1 | 6/2012 | Lamastra et al. | |
| 2013/0097704 A1 | 4/2013 | Gavrilut et al. | |
| 2013/0111540 A1 | 5/2013 | Sabin | |
| 2013/0185763 A1 | 7/2013 | Yasuda | |
| 2013/0318607 A1 | 11/2013 | Reed et al. | |
| 2013/0333037 A1 | 12/2013 | Bowen et al. | |
| 2014/0007264 A1 | 1/2014 | Berger | |
| 2014/0280887 A1 | 9/2014 | Kjendal et al. | |
| 2014/0280889 A1 | 9/2014 | Nispel et al. | |
| 2014/0359708 A1 | 12/2014 | Schwartz | |
| 2015/0040220 A1 | 2/2015 | Mantripragada et al. | |
| 2015/0324616 A1 | 11/2015 | Alarabi | |
| 2016/0072837 A1 | 3/2016 | Arrowood | |
| 2016/0219069 A1 * | 7/2016 | Mittig | H04L 63/1416 |
| 2016/0323300 A1 | 11/2016 | Boss et al. | |
| 2016/0323301 A1 | 11/2016 | Boss et al. | |
| 2016/0373470 A1 | 12/2016 | Boss et al. | |

OTHER PUBLICATIONS

Cho et al., "Hybrid Network Defense Model Based on Fuzzy Evaluation", The Scientific World Journal, vol. 2014, Article ID: 178937, 13 pages.

Wikipedia, "Honeypot (computing)", http://en.wikipedia.org/wiki/Honeypot_(computing), Apr. 3, 2015, 6 pages.

Vollmer et al., "Cyber-Physical System Security With Deceptive Virtual Hosts for Industrial Control Networks", IEEE Transactions on Industrial Informatics, vol. 10, No. 2, 2014, pp. 1337-1347.

Blowers et al., "Machine Learning Applied to Cyber Operations", Advances in Information Security, vol. 55, 2014, pp. 155-175.

Mell et al., "The NIST Definition of Cloud Computing", NIST, Special Publication 800-145, Sep. 2011, 7 pages.

Shimoda et al., "Sensor in the Dark: Building Untraceable Large-Scale Honeypots Using Virtualization Technologies", IEEE/IPSJ, 2010, 9 pages.

Kaur et al., G., "Intrusion Detection System Using Honeypots and Swarm Intelligence", ACAi, 2011, 5 pages.

Specification "Managing Security Breaches in a Networked Computing Environment" and Drawings in related U.S. Appl. No. 15/827,003, filed Nov. 30, 2017, 44 pages.

"List of IBM Patents or Patent Applications Treated as Related," 1 page.

Notice of Allowance in related U.S. Appl. No. 15/251,023 dated Sep. 29, 2017, 5 pages.

Notice of Allowance in related U.S. Appl. No. 14/699,218 dated Nov. 1, 2017, 5 pages.

Notice of Allowance in related U.S. Appl. No. 14/699,206 dated Nov. 2, 2017, 5 pages.

Specification "Data Protection in a Networked Computing Environment" and Drawings in related U.S. Appl. No. 15/842,131, filed Dec. 14, 2017, 42 pages.

Specification "Data Protection in a Networked Computing Environment" and Drawings in related U.S. Appl. No. 15/842,952, filed Dec. 15, 2017, 41 pages.

* cited by examiner

SYSTEM CONVERSION IN A NETWORKED COMPUTING ENVIRONMENT

FIELD OF THE INVENTION

The present invention generally relates to security of computing systems, and more particularly, to system security in a networked computing environment.

BACKGROUND

Cloud computing has become popular as organizations are discovering that it provides a cost-effective, scalable, and flexible option to deliver business or consume IT (Information Technology) services over a network environment such as the Internet. Cloud computing presents unique issues in terms of data security. A honeypot is a data security tool used to lure attackers and analyze attacker activity in computing environments. Use of honeypots in cloud environments is generally limited to generation of additional environments, some of which are honeypots with falsified data.

The concept of a honeypot for data security was introduced as an information system resource that helps to detect unauthorized use such as malicious attacks. There are two main types of honeypots: a production honeypot to protect an organization, and a research honeypot to predict, monitor, and learn. Honeypots can be automatically provisioned in cloud environments, and provisioned based on attacker activity. However, these solutions have considerable drawbacks of affecting either valid users or attacker system usage, which limits the value of the honeypot. As a result, traditional automated honeypot generation in a cloud environment suffers from several major limitations. For example, in systems that create honeypots up front (e.g., multiple application environments where one environment is the true environment), legitimate users still need to be routed to the valid environment. Therefore, sophisticated attackers can identify the valid environment with relative ease, and the value of the decoy (honeypot) environments is limited mainly to non-targeted attackers that would stumble onto such an environment. Systems that create honeypots in response to an attack suffer from the same problem in the other direction: if a valid system is being migrated away from an exposed system, valid users need to be migrated to the new, valid system. An attacker can simply monitor the valid user flow to recognize that a compromised environment has been converted into a honeypot.

SUMMARY

In a first aspect of the invention, there is a method of providing security in a networked computing environment. The method includes detecting, by at least one computer device, a breach of a first system in the networked computing environment. The method also includes identifying a second system in the in the networked computing environment as an at-risk system based on a proximity of the second system to the first system. The method additionally includes re-generating, by the at least one computer device, the second system as a new system at a new location in the networked computing environment. The method further includes converting, by the at least one computer device, the second system to a decoy system.

In another aspect of the invention there is a system for providing security in a networked computing environment. The system includes at least one computer device in the networked computing environment, wherein the at least one computer device is configured to detect a breach of a first system in the networked computing environment. For each of a plurality of other systems in the networked computing environment, the at least one computer device is configured to: determine a respective proximity-based risk factor for the other system; compare the risk factor for the other system to a threshold; and based on the comparing perform one of: (i) re-generate the other system as a new system at a new location and convert the other system to a decoy system; and (ii) maintain the other system unchanged.

In another aspect of the invention, there is a computer program product for providing security in a networked computing environment. The computer program product includes a computer readable storage medium having program instructions embodied therewith. The program instructions are executable by a computer device to cause the computer device to: detect a breach of a first system at a first location in the networked computing environment; determine a risk factor of a second system based on a proximity of the second system to the first system, wherein the second system is at a second location in the networked computing environment; identify the second system as an at-risk system based on the risk factor of the second system; determine a risk factor of a third system based on a proximity of the third system to the first system, wherein the third system is at a third location in the networked computing environment; identify the third system as a safe system based on the risk factor of the third system; re-generate the second system as a new system at a fourth location in the networked computing environment; convert the second system to a decoy system at the second location in the networked computing environment; and maintain the third system unchanged at the third location.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to security of computing systems, and more particularly, to system security in a networked computing environment. According to aspects of the invention, a breach of a system in a networked computing environment is detected. Based on detecting the breach, a risk factor is determined for other systems in the networked computing environment. In embodiments, the risk factor is based on proximity to the breached system, where proximity may be at least one of a physical and logical distance in the networked computing environment. In embodiments, when the risk factor for a particular system exceeds a threshold, the system is converted to a honeypot (decoy) system at its current location in the environment as well as re-generated at another location in the environment that is considered a lower risk location. Valid users are routed to the new system, while the decoy system is left intact as a honeypot. In embodiments, any system with a risk factor that is less than the threshold is not converted to a honeypot system. In this manner, implementations of the invention provide the advantage of providing system security while also conserving network resources by converting to honeypots only for those systems having a sufficiently high risk factor.

Aspects of the invention described herein are directed to systems and methods that enhance techniques of automated honeypot generation. Some solutions react to a breach by creating a new cloud infrastructure in a clean environment, or by transforming an existing system into a honeypot. However, these solutions do not take into account the topology of the environment and availability of devices at a higher level to more strongly react to the attack. Implementations of the invention may include identifying systems in a cloud environment that are within a predefined logical or physical distance relative to a breached system in the same environment, and automatically converting the identified systems to a honeypot (decoy) system. In embodiments, the automatic conversion of systems to honeypot systems may be performed on a priority basis in which the most at-risk system are converted first before the lower risk systems. In embodiments, the automatic conversion of systems to honeypot systems may be performed on a threshold basis in which only systems having a risk factor greater than a threshold value are converted. In embodiments, the risk factor of a single system may be based on proximity to a single breached system or plural breached systems. Implementations of the invention may also include installing additional security and monitoring software in at least one of a breached system and a system that is converted to a honeypot (decoy) system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
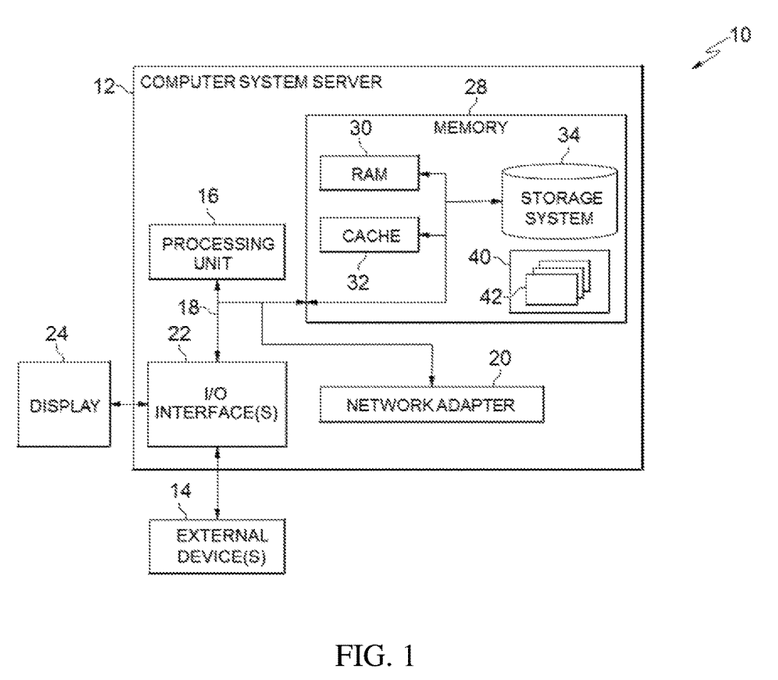
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
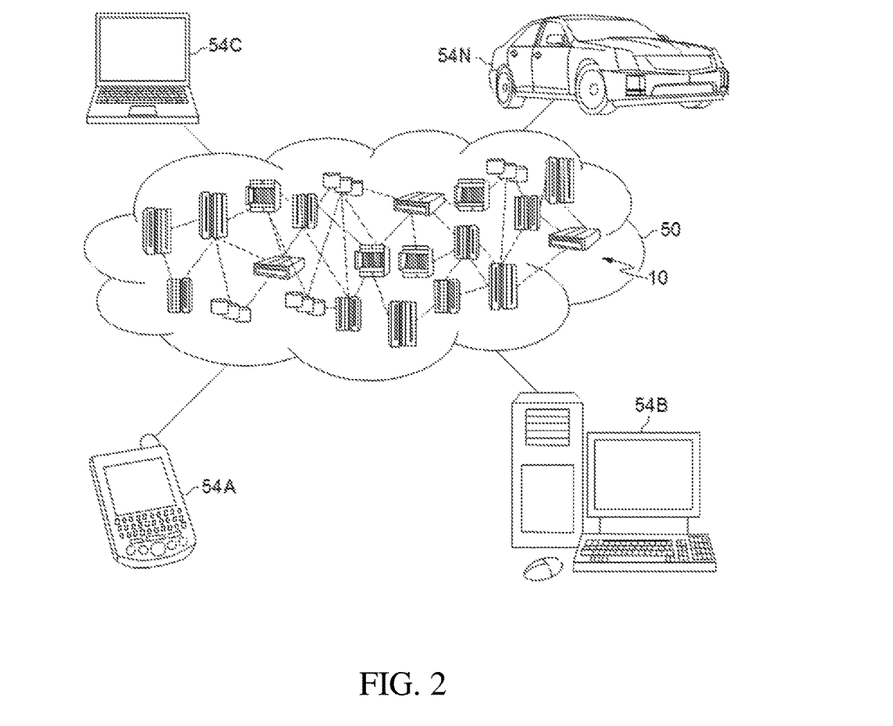
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
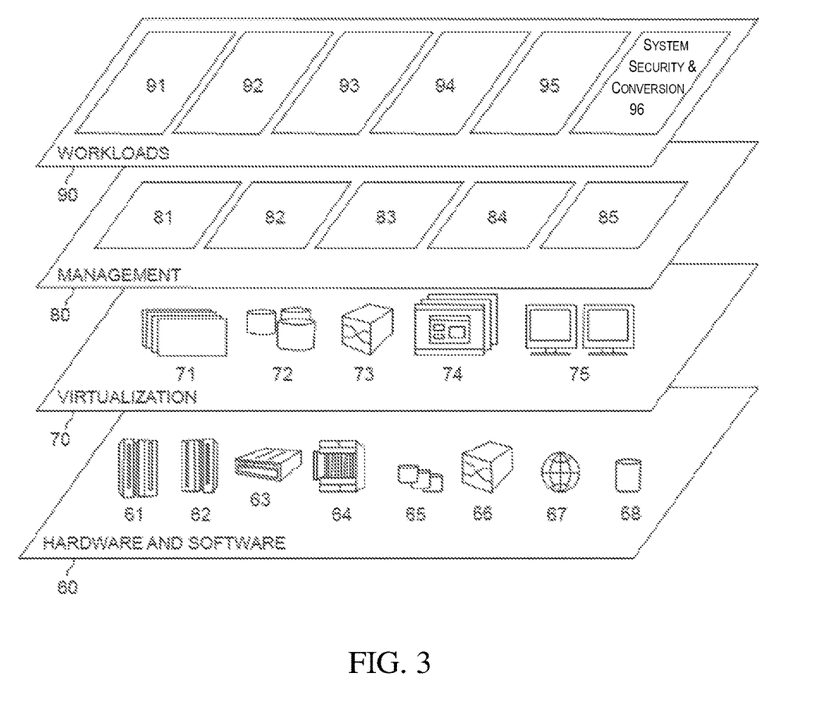
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system security & conversion 96. As described herein, system security & conversion 96 may include: detecting a breach (e.g., unauthorized access, denial of service attack, or other malicious activity) at a system in a networked computing environment; identifying an at-risk system based on a proximity to the breached system; converting the at-risk system to a honeypot (decoy) system at the system location; and re-generating the at-risk system to another location in the environment.

Figure 4:
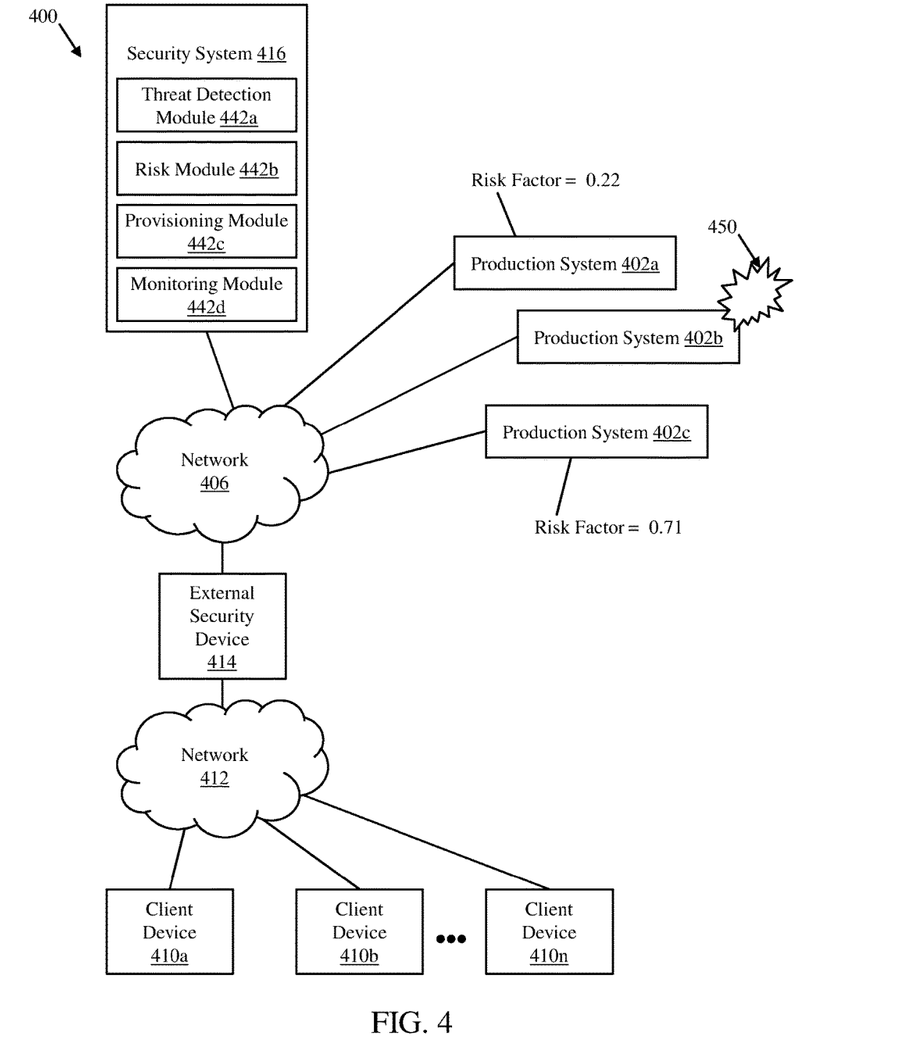
FIGS. 4 and 5 depict an illustrative environment and functionality in accordance with aspects of the invention.
Figure 5:
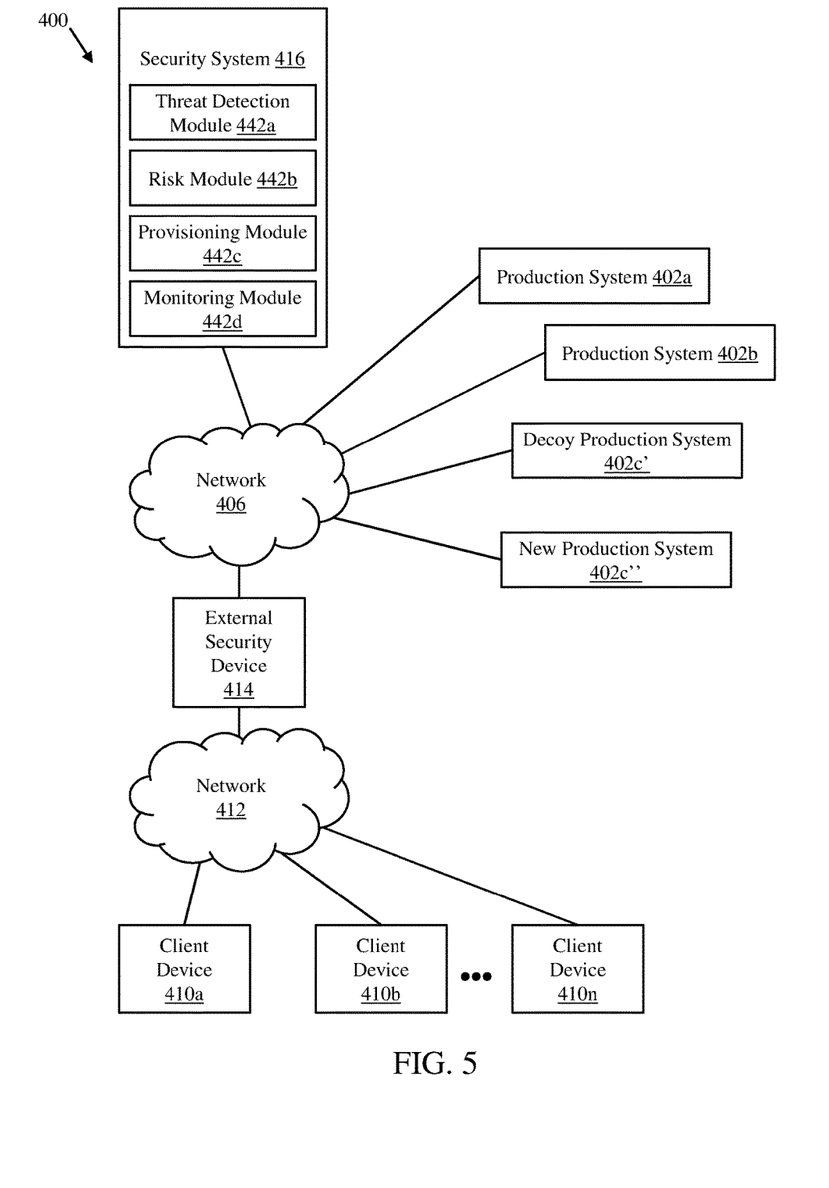

FIGS. 4 and 5 depict an illustrative environment for implementing the steps in accordance with aspects of the invention. The network topology illustrated in FIGS. 4 and 5 is exemplary and not intended to be limiting. Aspects of the invention may be used with any desired network topology, including ones different from that shown the figures.

Referring now to FIG. 4, a networked computing environment 400 includes a plurality of production systems 402*a-c*. Each of the production systems 402*a-c* may include a respective computer system/server 12 as described with respect to FIG. 1. Further, the environment 400 may be a cloud computing environment in which each of the production systems 402*a-c* are located at one or more computing nodes of the cloud computing environment, e.g., in a manner as described with respect to FIG. 2. The environment 400 may be a private cloud environment used by an enterprise, e.g., to conduct business functions. The production systems 402*a-c* may be at respective different nodes of the environment 400. Alternatively, two or more of the production systems 402*a-c* may be at a same node of the environment 400. Each of the production systems 402*a-c* may be a stand-alone system on a single dedicated machine. Alternatively, one or more of the production systems 402*a-c* may be a virtual machine running on a host computer with one or more other virtual machines. The invention is not limited to three production systems 402*a-c* as shown, and instead any desired number of production systems may be connected to the network 406 in any desired network topology, e.g., using any desired number and arrangement of routing devices.

With continued reference to FIG. 4, client devices 410*a-n* may be operatively connected to the network 406 via a second network 412 such as the Internet. The client devices 410*a-n* may be conventional user computer devices, such as computing devices 54A-N shown in FIG. 2. An external security device 414, such as a firewall and routing device, may be interposed between the network 406 and the second network 412 and thus define a boundary of the environment 400. In this manner, valid users may be provided access to one or more of the production systems 402*a-c* by providing authentication credentials to the external security device 414 via one of the client devices 410*a-n*.

In one exemplary implementation, the production systems 402*a-c* are owned or operated by one or more enterprises. Each production system 402*a-c* may include, for example, at least one of a production server and a production database. A production server may include an application server such as a web server, for example, and a production database may include data associated with customers of the enterprise. An individual customer of the enterprise may use a client device 410*a-n* to access one of the production systems 402*a-c* via an Internet address, at which point the customer may utilize an application served by the production server that accesses, changes, or otherwise uses data contained in the production database. As is understood in the art, an application server may include a computing device that hosts an application program and serves the application program to a networked client computing device. As is further understood in the art, a database may include a collection of data that is stored on a computing device and that is accessed through an application server. Aspects of the invention are not limited to this exemplary implementation, and other implementations may be used within the scope of the invention.

Still referring to FIG. 4, according to aspects of the invention, the environment 400 includes a security system 416 connected to the network 406. In embodiments, the security system 416 includes a threat detection module 442*a*, a risk module 442*b*, a provisioning module 442*c*, and a monitoring module 442*d* that correspond to one or more program modules 42 as described with respect to FIG. 1. In embodiments, the threat detection module 442*a* is configured to detect a breach of one or more of the production systems 402*a-c* by a client device (e.g., client device 410*a-n*). The threat detection module 442*a* may use security and/or forensic software to collect and/or analyze data associated with actions of a client device that are directed at a particular one of the production systems 402*a-c*, such as a client device accessing, probing, or scanning the particular system. For example, the threat detection module 442*a* may use security information and event management (SIEM) software to detect a breach of the particular system.

As described herein, a breach may include unauthorized access of a particular one of the production systems 402*a-c*, an attack on the particular system such as a denial of service attack, or other malicious activity that targets the particular system. The data collected by the threat detection module 442*a* may be used in an automated or semi-automated manner to flag certain behavior as a breach and to determine a vulnerability of the virtual machine that permitted the breach. For example, a human user, such as an IT security analyst, may use the data obtained by the threat detection module 442a to perform a forensic analysis of actions taken in the environment and at the particular system for the purpose of identifying a breach and the vulnerability that permitted the breach. In another example, the threat detection module 442a may automatically detect and indicate a breach based on the collected data satisfying one or more predefined conditions that define a breach. Implementations of the invention are not limited to these techniques for detecting a breach, and any suitable techniques (conventional or later developed) may be utilized by the threat detection module 442a.

As depicted in FIG. 4, the threat detection module 442a detects a breach 450 at production system 402b. Based on detecting the breach 450, the risk module 442b determines a risk factor for each of the other productions systems in the environment 400, e.g., production systems 402a and 402c. In embodiments, the risk factor for a particular system is based on the proximity of the particular system to the system at which the breach was detected. For example, the risk factor for production system 402a is determined based on the proximity of production system 402a to production system 402b (the breached system). Similarly, the risk factor for the risk factor for production system 402c is determined based on the proximity of production system 402c to production system 402b (the breached system).

As used herein, proximity is based on at least one of a physical and logical distance between the respective systems in the networked computing environment. Physical distance may be expressed in terms of number of physical network hops between the respective systems, and whether the respective systems share any physical resources such as a host machine, physical router, or physical switch. Logical distance may be expressed in terms of whether the respective systems share a hypervisor, use a same operating system, use a same application (e.g., middleware), are owned or operated by a same enterprise, or use a same storage application. Aspects of the invention are not limited to these exemplary measures of physical distance and logical distance, and any suitable measures may be used.

In embodiments, the risk module 442b determines a risk factor for each of the production systems in the environment (other than the breached system) using a mathematical expression or formula that is based on at least one of the physical and logical distance between the respective systems. For example, the risk factor may be determined according to the following expression:

$$\text{RiskFactor}(\text{System}\_a) = \text{Value}\_1(a) + \text{Value}\_2(a) + \ldots + \text{Value}\_n(a) \quad \text{Expression (1)}$$

In Expression 1, RiskFactor(System_a) is the calculated risk factor for a particular system "a" in the environment, e.g., the risk factor for production system 402a relative to breached production system 402b in environment 400. Value_1(a) through Value_n(a) are numerical values that are based on "n" number of parameters defined by various measures of proximity of the system "a" to the breached system. The formula in Expression 1 is exemplary, and different formulas may be used in other implementations of the invention.

In embodiments, Value_1(a) through Value_n(a) are assigned predefined numerical values that are based on data that defines a measure of at least one of a physical and logical distance between the respective systems. For example, Value_1 may have a numerical value of 0.50 when the respective systems share a physical host machine and a value of 0.0 when the systems do not have a same physical host machine. As another example, Value_2 may have a value of 0.71 when the respective systems have a same hypervisor and a value of 0.0 when the systems do not have a same hypervisor. In another example, Value_n may have a numerical value of 0.22 when the respective systems have a same operating system and a value of 0.0 when the systems do not have a same operating system. Any number "n" of Value_1 through Value_n may be used. Further, the numerical values for each of Value_1 through Value_n may be predefined in any desired manner, e.g., to weight certain proximity parameters more than others.

In embodiments, the risk module 442b obtains or accesses existing network topology data used in determining the numerical values for Value_1(a) through Value_n(a) for each system in the environment. For example, when determining the risk factor for production system 402a relative to the breached production system 402b, the risk module 442b obtains or accesses existing network topology data that defines whether the production systems 402a and 402b share a same host machine (e.g., for determining Value_1), whether the production systems 402a and 402b share a same hypervisor (e.g., for determining Value_2), and whether the production systems 402a and 402b have a same operating system (e.g., for determining Value_n). Data defining the network topology is available from the owner and/or administrator of the environment 400.

Still referring to FIG. 4, in this example the risk module 442b determines that production system 402a has a risk factor of 0.22 and that production system 402c has a risk factor of 0.71. In embodiments, the risk module 442b compares each determined risk factor to a predefined threshold for determining which of the systems are considered at-risk systems. The threshold can be any desired number, and may be predefined in a coordinated manner with the values of Value_1 through Value_n to define a tailored risk tolerance for systems within the environment 400. In the example depicted in FIG. 4, the threshold has a value of 0.70. Therefore, production system 402a is identified as a safe system (i.e., not at-risk) because its risk factor is less than the threshold (i.e., 0.22<0.70), whereas production system 402c is identified as an at-risk system because its risk factor is greater than the threshold (i.e., 0.71>0.70). In embodiments, a system identified as a safe system is left unchanged in the environment 400.

Now referring to FIG. 5, according to aspects of the invention, the provisioning module 442c converts an identified at-risk production system (e.g., production system 402c) to a decoy production system 402c', and generates a new production system 402c" at a different location within the environment 400. In embodiments, the at-risk production system (e.g., production system 402c) is converted to the decoy production system 402c' by removing sensitive data from the at-risk system while leaving the elements of the at-risk system at their existing locations in the environment 400. In this manner, the at-risk system (e.g., production system 402c) is converted to a honeypot (decoy) system (e.g., decoy production system 402c') without the at-risk system having actually been breached, but rather due to a risk factor based on another breached system (e.g., production system 402b) within the environment.

As shown in FIG. 5, in embodiments, generating a new production system 402c" includes provisioning the new production system 402c" at another location in the environment 400. The new production system 402c" may be configured to perform the same business function(s) as the original production system 402c. For example, the new production system 402c'' may be configured to serve the same application(s) and may be provided with the same data as the original production system 402c. The provisioning of the new production system 402c'' may be performed in an automated or semi-automated manner using conventional techniques. For example, in a semi-automated implementation, one or more scripts of the provisioning module 442c may prompt a user to provide input relating to user-selected features of the new production system 402c'', and the provisioning module 442c may then automatically generate the new production system 402c'' based on the input provided by the user. In an automated implementation, the provisioning module 442c may generate an exact copy of the production system 402c within the environment 400 without any input from a user.

In embodiments, the new production system 402c'' is generated at a location in the environment 400 such that the new production system 402c'' has a risk factor that is less than the risk factor for the at-risk system 402c, and preferably less than the threshold. For example, the provisioning module 442c may be configured to identify candidate new locations for the new production system 402c'' within the environment 400 and communicate the new locations to the risk module 442b. The risk module 442b then determines a risk factor for the new system 402c'' at each of the new locations and communicates the risk factors to the provisioning module 442c. The provisioning module 442c then selects the new location with the lowest risk factor and generates the new production system 402c'' at the selected new location. At this point, a user who provides valid credentials and requests services that were provided by the original production system 402c are now routed to the new production system 402c'', and the converted decoy production system 402c' remains intact as a honeypot.

Still referring to FIG. 5, in embodiments, the provisioning module 442c installs additional security/monitoring software on at least one of the breached production system 402b and the decoy production system 402c'. The additional security/monitoring software may be used to monitor malicious behavior on the production systems 402b and 402c', e.g., so that data associated with future activity of an attacker can be collected and analyzed at greater depth. In this manner, the breached production system 402b may be converted into a fishbowl to watch actions of an attacker and make determinations about the attacker and what data they compromised. The breached production system 402b may also be migrated in a conventional manner in response to the breach.

According to aspects of the invention, the combination of proximity-based conversion and added monitoring capability permits the security system 416 to monitor other production systems in the environment 400 to determine whether the initial attacker that caused the breach 450 (shown in FIG. 4) has extended an attack to other systems. In the event the attacker does not leverage the attack to other machines based on proximity, the security system 416 may be configured to take corrective actions including: updating the proximity algorithm to account for a high-confidence risk not having spread; and scale back monitoring capability or migrate production systems back to the original location after a predefined period of time. On the other hand, in the event the attacker does successfully spread their attack based on activity, the security system 416 may be configured to take additional steps to account for the leveraged attack including: updating the proximity algorithm to raise risk confidence based on the leveraged attack; immediately migrating all newly determined at-risk systems; and begin patching unaffected systems based on proximity.

Figure 6:
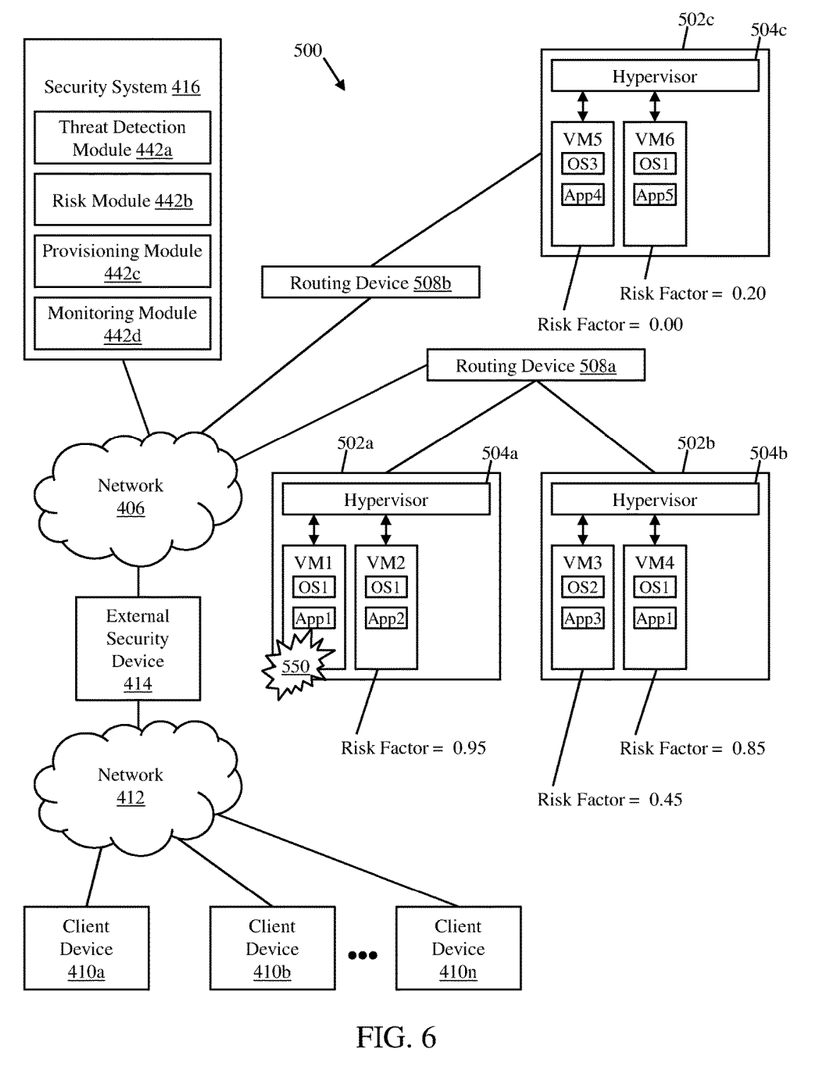
FIGS. 6 and 7 depict an illustrative environment and functionality in accordance with aspects of the invention.
Figure 7:
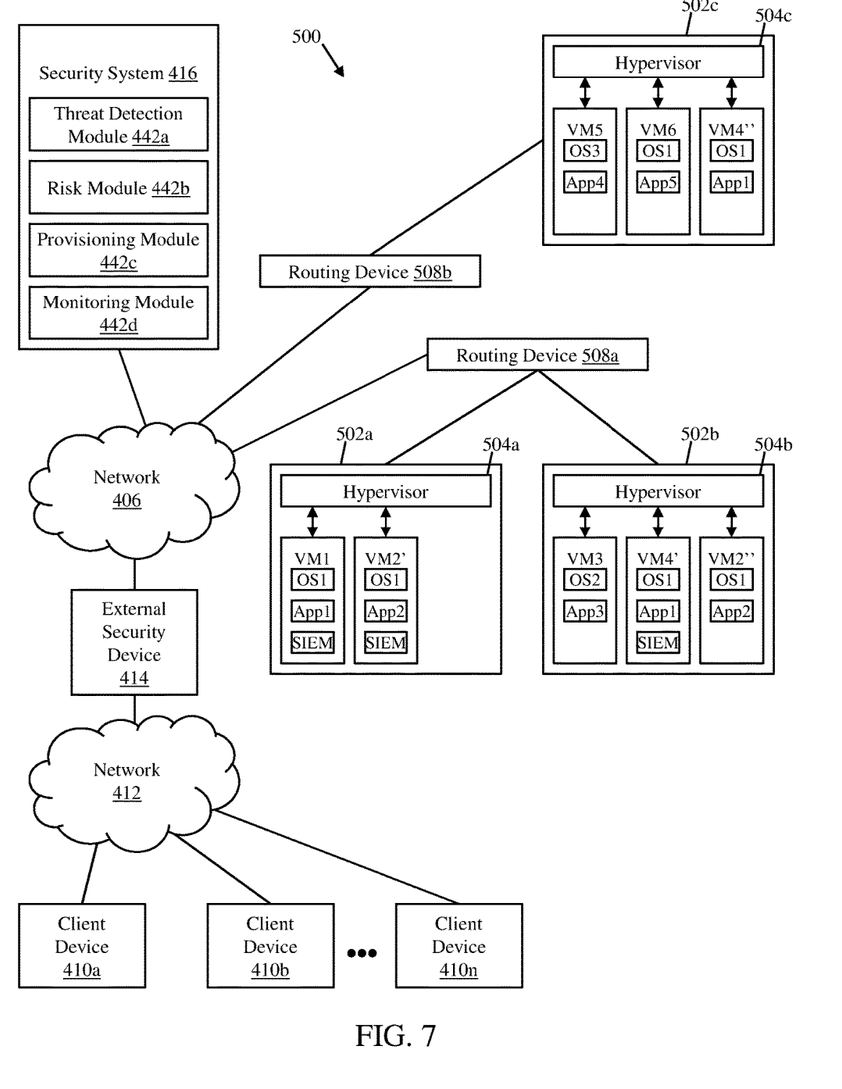

FIGS. 6 and 7 depict another illustrative environment for implementing the steps in accordance with aspects of the invention. The network topology illustrated in FIGS. 6 and 7 is exemplary and not intended to be limiting. Aspects of the invention may be used with any desired network topology, including ones different from that shown the figures.

FIGS. 6 and 7 illustrate an exemplary implementation of the invention in an environment composed of hypervisors and virtual machines, since such an environment poses acute concerns about cloud data security. Elements in FIGS. 6 and 7 with the same reference numbers as those described in FIGS. 4 and 5 are the same elements.

Referring now to FIG. 6, a networked computing environment 500 includes a plurality of computer systems 502a-c. Each of the computer systems 502a-c may include a respective computer system/server 12 as described with respect to FIG. 1. Further, the environment 500 may be a cloud computing environment in which each of the computer systems 502a-c are located at one or more computing nodes of the cloud computing environment, e.g., in a manner as described with respect to FIG. 2. The environment 500 may be a private cloud environment used by an enterprise, e.g., to conduct business functions. The computer systems 502a-c may be at respective different nodes of the environment 500. Alternatively, two or more of the computer systems 502a-c may be at a same node of the environment 500.

As illustrated in FIG. 6, the computer system 502a includes a hypervisor 504a and is a host computer system for virtual machines VM1 and VM2. Similarly, computer system 502b includes a hypervisor 504b and is a host computer system for virtual machines VM3 and VM4. Similarly, computer system 502c includes a hypervisor 504c and is a host computer system for virtual machines VM5 and VM6. As is understood in the art, a hypervisor is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. As illustrated in FIG. 6, each virtual machine (e.g., VM1-VM6) may run its own respective operating system (e.g., OS1-OS3) and application (e.g., App1-App5). Different virtual machines may run different operating system and/or different applications.

The virtual machines VM1-VM6 may be operated independent from, or in conjunction with, each other. For example, virtual machine VM1 may run an application server such as a first web server that is owned or provisioned by a first enterprise, and virtual machine VM2 may run an application server such as a second web server that is owned or provisioned by a second enterprise that is different than the first enterprise. In this manner, each independent virtual machine VM1-VM6 may represent an independent system within the networked computing environment 500.

As further depicted in FIG. 6, each of the computer systems 502a-c is connected to a network 406 by a routing device. For example, computer systems 502a and 502b are connected to the network 406 via routing device 508a, and computer system 502c is connected to the network 406 via routing device 508b. The routing devices 508a-b can include conventional routing devices, such as network routers, network switches, etc. Moreover, any number of computer systems may be connected to the network in any desired topology using any desired number and arrangement of routing devices.

With continued reference to FIG. 6, client devices 410a-n may be operatively connected to the network 406 via a second network 412 such as the Internet. An external security device 414, such as a firewall and routing device, may be interposed between the network 406 and the second network 412 and, thus, define a boundary of the environment 500. Valid users may be provided access to one or more of the virtual machines VM1-VM6 by providing authentication credentials to the external security device 414 via one of the client devices 410a-n.

Still referring to FIG. 6, according to aspects of the invention, the environment 500 includes a security system 416 connected to the network 406. In embodiments, the threat detection module 442a is configured to detect a breach of one or more of the virtual machines (e.g., VM1-VM6) by a client device (e.g., client device 410a-n). In the example illustrated by FIG. 6, the threat detection module 442a detects a breach 550 at virtual machine VM1.

Based on detecting the breach 550, the risk module 442b determines a risk factor for each of the other virtual machines VM2-VM6 in the environment 500. The risk factor for each VM may be determined according to Expression 1, or any other desired proximity-based formula. In the example depicted in FIG. 6, Value_1 of Expression 1 has a value of 0.75 when the respective VMs share a same hypervisor, and a value of 0.0 otherwise. Value_2 of Expression 1 has a value of 0.45 when the respective VMs have different hypervisors but are on a same routing device, and a value of 0.0 otherwise. Value_3 of Expression 1 has a value of 0.20 when the respective VMs run a same operating system, and a value of 0.0 otherwise. Value_4 of Expression 1 has a value of 0.20 when the respective VMs run a same application (e.g., middleware), and a value of 0.0 otherwise.

Still referring to the example shown in FIG. 6, the risk factor for VM2 is calculated as 0.95=0.75+0.20 since VM2 and VM1 have the same hypervisor 504a and the same operating system OS1. The risk factor for VM3 is calculated as 0.45 since VM3 and VM1 are on the same routing device 508a, but have different operating systems (e.g., OS1 and OS2) and different applications (e.g., App1 and App3). The risk factor for VM4 is calculated as 0.85=0.45+0.20+0.20 since VM4 and VM1 are on the same routing device 508a, have the same operating system (e.g., OS1), and have the same application (e.g., App1). In a similar manner, the risk factor for VM5 is determined as 0.00 and the risk factor for VM6 is determined as 0.20. In this example, VM2 and VM4 are identified as at-risk machines since their risk factors exceed the threshold value of 0.70.

Accordingly, as shown in FIG. 7, the security system 416 converts VM2 to a decoy machine VM2' and generates a new instance VM2" at another location in the environment 500. Similarly, the security system 416 converts VM4 to a decoy machine VM4' and generates a new instance VM4" at another location in the environment 500. In embodiments, the at-risk machine with the higher risk factor is converted and regenerated first. Accordingly, in this example, VM2 is converted and regenerated prior to VM4 since VM2 has a higher risk factor than VM4. In accordance with additional aspects of the invention, additional security/monitoring software "SIEM" is added to each of the breached system VM1, and the converted (decoy) systems VM2' and VM4'.

As described herein, a predefined threshold may be use as the primary factor for determining whether to convert and regenerate an at-risk system. However, aspects of the invention are not limited to using only a threshold. In embodiments, the size of the at-risk system may be taken into consideration as a factor in determining whether to convert and/or regenerate an at-risk system. For example, a smaller and easier to move system may trigger conversion and/or regeneration at a lower risk factor compared to a larger and more complex system that would require a higher risk factor for deciding to convert and/or regenerate. In further embodiments, the sensitivity of an at-risk system to the disruption caused by moving the at-risk system may be taken into consideration as a factor in determining whether to convert and/or regenerate the at-risk system. For example, an at-risk system that is very sensitive to disruptions may require a higher risk factor before deciding to convert and/or regenerate, compared to a system that is less sensitive to disruptions that would be converted and/or regenerated based on having a lower risk factor. In this manner, the threshold may be changed based on other factors, or there may be plural different thresholds that are used for different types of systems (e.g., small versus large systems, sensitive versus not sensitive systems, etc.).

As described herein, an at-risk system may be converted to a honeypot in its original location and also regenerated at a safer location in the networked environment. In some embodiments, the at-risk system is only regenerated but a conversion is not performed, for example, due to the resource cost of maintaining both a honeypot system and the regenerated system. Accordingly, a first (high) threshold and second (low) threshold may be used where: the at-risk system is converted and regenerated when the risk factor exceeds the first threshold; the at-risk system is only regenerated but not converted to a honeypot when the risk factor is greater than the second threshold and less than the first threshold; and the at risk-system is maintained unchanged (not regenerated or converted) when the risk factor is less than the second threshold. Any number of thresholds may be used. For example, in addition to the first (high) threshold and second (low) threshold, there may be a third threshold that is greater than the first threshold where a risk factor being greater than the third threshold trigger the creation of plural honeypots based on the at-risk system. Similarly, the decision to install additional monitoring software may be based on plural different thresholds, with different actions taken depending on which thresholds are exceeded by the risk factor.

Figure 8:
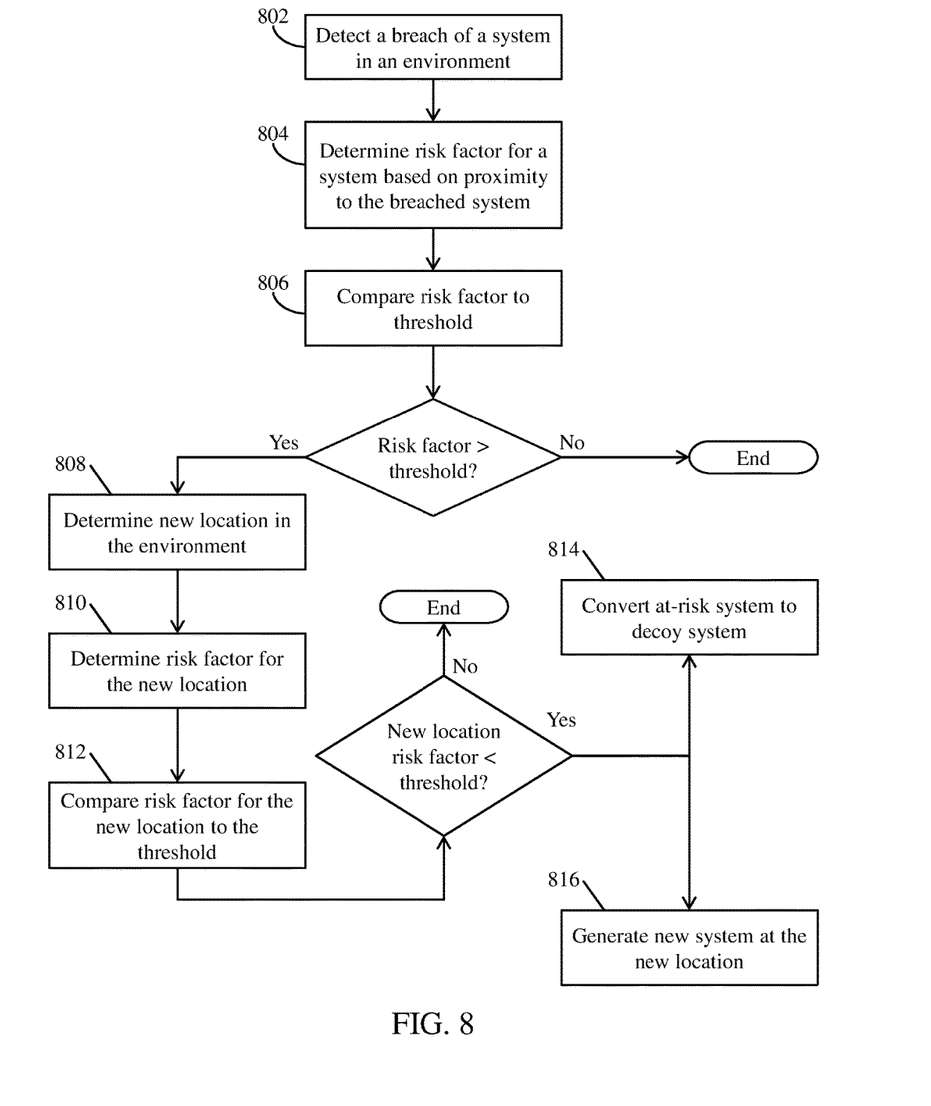
FIG. 8 depicts a flow diagram of an exemplary process in accordance with aspects of the invention.

FIG. 8 shows an exemplary flow for performing aspects of the present invention. The steps of FIG. 8 may be implemented in the environments of FIGS. 1-7, for example. As noted above, the flowchart(s) illustrate the architecture, functionality, and operation of possible implementations of systems, methods, and computer program products according to various embodiments of the present invention.

FIG. 8 depicts an exemplary flow for a process in accordance with aspects of the present invention. At step 802, a breach is detected in a networked computing environment. In embodiments, the networked computing environment includes systems such as production systems 402a-c and/or virtual machines VM1-VM6 as described with respect to FIGS. 4-7. The breach may be, for example, an unauthorized access, attack, or other malicious activity at one of the systems of the environment. The breach may be detected using a computer system (such as security system 416 executing a threat detection module 442a) that communicates with one or more elements of the networked computing environment.

At step 804, the security system (such as security system 416 executing a risk module 442b) determines a risk factor for another system in same the environment as the breached system. The risk factor for the other system may be determined based on a proximity of the other system to the breached system, e.g., as described with respect to FIGS. 4 and 6.

At step 806, the security system (such as security system 416 executing the risk module 442*b*) compares the risk factor determined at step 804 to a threshold value. The comparing may be performed in a manner similar to that described with respect to FIGS. 4-7. In the event the risk factor is less than the threshold value, then the other system is deemed a safe system (i.e., a not-at-risk system) and the process ends for this particular other system by maintaining this system unchanged at its current location. On the other hand, if the risk factor is greater than the threshold value, then the other system is deemed an at-risk system.

At step 808, the security system (such as security system 416 executing a provisioning module 442*c*) determines a new location in the environment for the at-risk system. The determining may be performed in a manner similar to that described with respect to FIGS. 4-7.

At step 810, the security system (such as security system 416 executing the risk module 442*b*) determines a risk factor for the at-risk system at the new location. Step 810 may be performed in a manner similar to step 804, but with the at-risk system hypothetically located at the new location.

At step 812, the security system (such as security system 416 executing the risk module 442*b*) compares the risk factor determined at step 810 to the threshold value. Step 812 may be performed in a manner similar to step 806. In the event the risk factor for the at-risk system at the new location is greater than the threshold value, then the new location is deemed unfit and the process ends. On the other hand, if the risk factor for the at-risk system at the new location is less than the threshold value, then at step 814 the security system converts the at-risk system to a decoy system and at step 816 the security system re-generates the at-risk system as a new system at the new location in the environment.

The converting at step 814 may be performed in a manner similar to that described with respect to FIGS. 5 and 7. For example, the elements of the at-risk system may be left in place in the environment and sensitive data may be removed from the at-risk system. Moreover, additional security and/or monitoring software may be installed on the decoy system, such that the security system (such as security system 416 executing a monitoring module 442*d*) may more closely monitor future attacker activity on the decoy system.

The re-generating at step 816 may be performed in a manner similar to that described with respect to FIGS. 5 and 7. For example, a copy of the at-risk system may be provisioned at the new location. Moreover, users that provide valid credentials for accessing the particular system will be routed to the new system instead of the decoy system.

The steps of FIG. 8 are described with respect to analyzing a single system relative to the breached system. However, the steps may be repeated for each other system in the same environment as the breached system. In embodiments, steps 804 and 806 are performed for all other systems in the environment prior to proceeding to step 808, e.g., to determine all the at-risk systems in the environment. After determining all the at-risk systems, steps 808, 810, and 812 (and steps 814 and 816 if appropriate) may be performed for each individual at-risk system in an order based on the risk factors for each at-risk system. For example, steps 808, 810, and 812 (and steps 814 and 816 if appropriate) may be performed first for the at-risk system having the highest risk factor. Subsequently, the same steps may be performed for the at-risk system having the second highest risk factor.

In still another embodiment, the invention provides a computer-implemented method for system security on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of providing security in a networked computing environment, comprising:
   detecting, by at least one computer device, a breach of a first system in the networked computing environment;
   determining a distance between a second system in the networked computing environment and the first system, the second system being a non-breached system;
   determining whether or not the non-breached second system is an at-risk system based on whether or not the determined distance between the non-breached second system and the first system exceeds a threshold; and
   in response to determining that the non-breached second system is the at-risk system, re-generating, by the at least one computer device, the non-breached second system as a new virtual machine at a new location in the networked computing environment,
   wherein the determining whether or not the non-breached second system is the at-risk system comprises determining a risk factor for the non-breached second system and comparing the risk factor to the threshold.

2. The method of claim 1, wherein the risk factor is determined based on at least one of:
   a physical distance between the first system and the non-breached second system; and
   a logical distance between the first system and the non-breached second system.

3. The method of claim 1, further comprising:
   determining a new risk factor for the new virtual machine at the new location; and
   comparing the new risk factor to the threshold.

4. The method of claim 1, further comprising adding security software to the first system based on the detecting the breach.

5. The method of claim 1, further comprising:
identifying a third system in the networked computing environment as a safe system based on a determined distance between the third system and the first system; and
maintaining the third system unchanged based on the identifying the third system as a safe system.

6. The method of claim 1, further comprising:
determining a respective risk factor for plural systems in the networked computing environment; and
identifying each one of the plural systems as one of at-risk and safe based on comparing the respective risk factors to the threshold.

7. The method of claim 1, wherein a service provider at least one of creates, maintains, deploys and supports the at least one computer device.

8. The method of claim 1, wherein the detecting the breach of the first system, the determining the distance, the determining whether or not the non-breached second system is the at-risk system, and the re-generating the non-breached second system are provided by a service provider on a subscription, advertising, and/or fee basis.

9. The method of claim 1, wherein the detecting the breach of the first system, the determining the distance, the determining whether or not the non-breached second system is the at-risk system, and the re-generating the non-breached second system are provided by software as a service in a cloud environment.

10. A system for providing security in a networked computing environment, comprising:
at least one computer device in the networked computing environment, the at least one computer device comprising:
a hardware processor, a computer readable memory, and a computer readable storage medium;
program instructions to detect a breach of a first system in the networked computing environment; and
program instructions to, for each of a plurality of other systems in the networked computing environment that are non-breached systems:
determine a respective distance-based risk factor for the non-breached other system;
determining whether or not the risk factor for the non-breached other system exceeds a threshold;
in response to determining that the risk factor exceeds the threshold, re-generating the non-breached other system as a new virtual machine at a new location; and
in response to determining that the risk factor does not exceed the threshold, maintaining the non-breached other system unchanged,
wherein the respective distance-based risk factor for each of the non-breached other systems is based on at least one of:
a physical distance between the first system and the non-breached other system; and
a logical distance between the first system and the non-breached other system,
wherein the at least one computer device is further configured to add security software to the first system based on the detecting the breach, and
wherein each one of the plurality of non-breached other systems comprises a virtual machine running on one of a plurality of hypervisors in the networked computing environment.

11. The system of claim 10, wherein the networked computing environment comprises a cloud computing environment.

12. The system of claim 10, wherein the networked computing environment comprises a private cloud computing environment.

13. The system of claim 10, wherein:
the first system, the plurality of non-breached other systems, and the at least one computer device are connected to a private network; and
a client device in a public network accesses the private network through an external security and routing device.

14. A computer program product for providing security in a networked computing environment, the computer program product comprising a computer readable storage device having program instructions embodied therewith, the program instructions being executable by a computer device to cause the computer device to:
detect a breach of a first system at a first location in the networked computing environment;
determine a risk factor of a second system based on a distance between the second system and the first system, wherein the second system is a non-breached system at a second location in the networked computing environment;
in response to determining that the risk factor of the non-breached second system exceeds a threshold:
identify the non-breached second system as an at-risk system; and
re-generate the non-breached second system as a new virtual machine at a fourth location in the networked computing environment;
determine a risk factor of a third system based on a distance between the third system and the first system, wherein the third system is a non-breached system at a third location in the networked computing environment; and
in response to determining that the risk factor of the non-breached third system does not exceed the threshold, identify the non-breached third system as a safe system and maintain the non-breached third system unchanged at the third location,
wherein:
the distance between the non-breached second system and the first system is determined based on at least one of: a physical distance between the non-breached second system and the first system; and a logical distance between the non-breached second system and the first system;
the distance between the non-breached third system and the first system is determined based on at least one of: a physical distance between the non-breached third system and the first system; and a logical distance between the non-breached third system and the first system; and
the program instructions cause the computer device to add security software to the first system based on the detecting the breach.

* * * * *